Oct. 25, 1932.　　O. M. SUMMERS　　1,884,363
REFRIGERATING APPARATUS
Filed Aug. 31, 1929　　2 Sheets-Sheet 1

Otto M. Summers INVENTOR

BY

Spencer, Hardman & Fehr ATTORNEYS

Oct. 25, 1932.   O. M. SUMMERS   1,884,363
REFRIGERATING APPARATUS
Filed Aug. 31, 1929   2 Sheets-Sheet 2
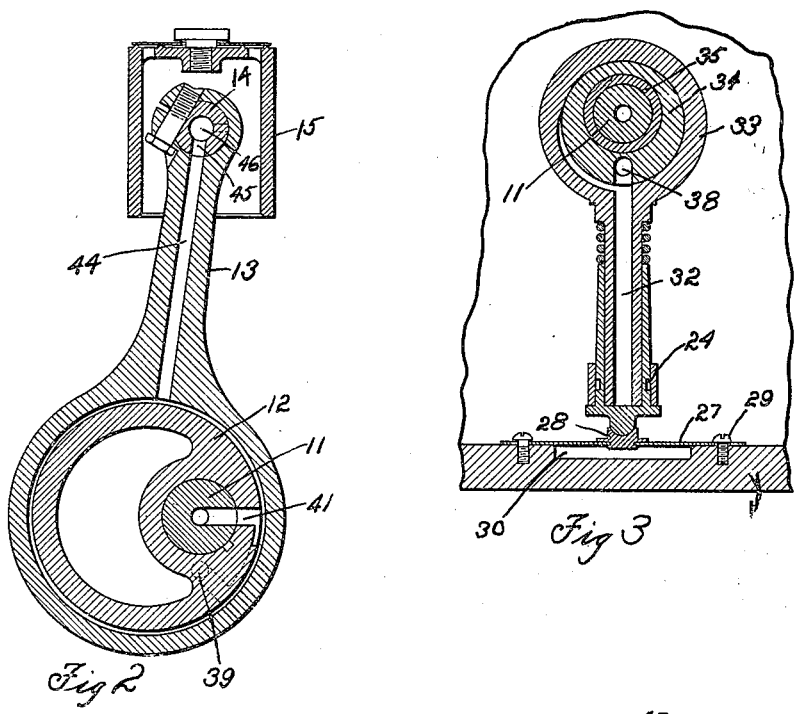
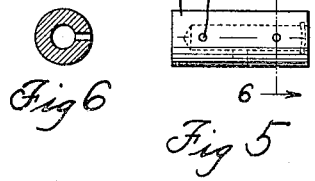
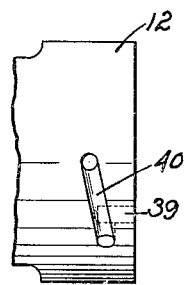

Patented Oct. 25, 1932

1,884,363

UNITED STATES PATENT OFFICE

OTTO M. SUMMERS, OF DAYTON, OHIO, ASSIGNOR TO FRIGIDAIRE CORPORATION, OF DAYTON, OHIO, A CORPORATION OF DELAWARE

REFRIGERATING APPARATUS

Application filed August 31, 1929. Serial No. 389,827.

This invention relates to refrigerating apparatus and especially to the lubrication of the moving parts of certain elements of said refrigerating apparatus.

An object of the invention is to provide adequate lubrication for the moving parts in refrigerating apparatus.

Another object of the invention is to provide lubrication for the compressor in a manner that will not readily distribute oil to other parts of the refrigerating apparatus.

Another object of the invention is to provide an easily accessible pump means for circulating the lubricant.

Further objects and advantages of the present invention will be apparent from the following description, reference being had to the accompanying drawings, wherein a preferred form is clearly shown.

In the drawings:

Fig. 2 is a cross section on line 2—2 of Fig. 1.

Fig. 3 is a cross section on line 3—3 of Fig. 1.

Fig. 4 is a portion of the exterior surface of the eccentric disclosed in Fig. 2.

Fig. 5 is a perspective view of a piston pin.

Fig. 6 is a cross section on line 6—6 of Fig. 5.

Figure 1:
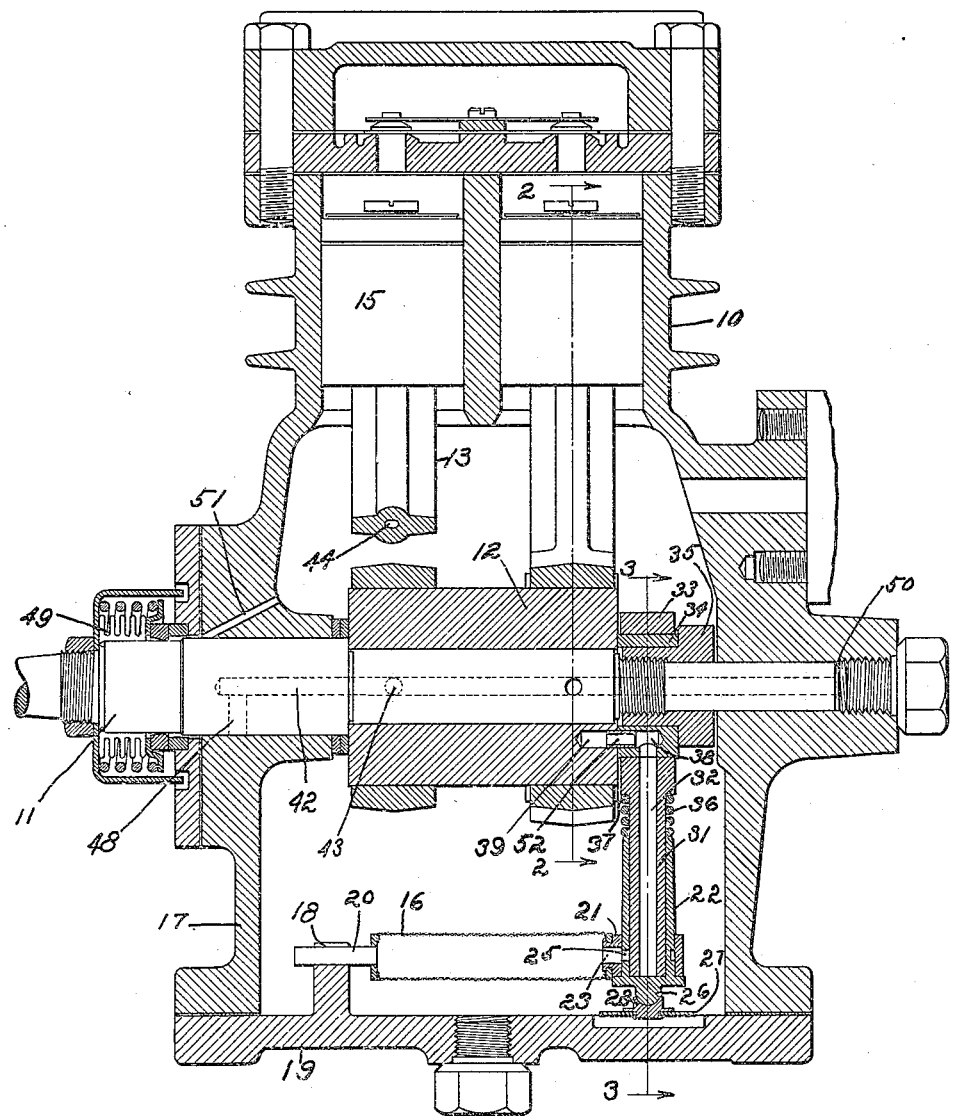
Fig. 1 is a cross section thru a compressor to which the invention has been applied.

One of the problems in connection with refrigerating apparatus is the efficient lubrication of the moving parts especially in the compressor. This problem differs from the problem of lubricating the moving parts of other apparatus due to the fact that the interior of the compressor is part of a closed gas-tight circuit. Due to this closed gas-tight circuit and the fact that suction and pressure are generally depended upon to keep the refrigerant circulating properly a certain amount of oil is generally carried along with the refrigerant in passing around this closed system. This is especially true where the oil is churned into a foam and splashed about the casing by one or more revolving elements. As the refrigerant gas is sucked thru the casing, the foaming oil is in a state best adapted to be carried to other parts of the system where it is not desired. While the apparatus generally is of course designed to have this oil returned to the place where it is needed, conditions may arise under which there may be a very small amount of oil at the particular place where lubrication is needed and this amount may be below the minimum required by the lubricating system of the compressor. Altho sufficient oil would eventually be returned to the oil reservoir from the other parts of the system the apparatus is likely to be damaged by running during even this short time with insufficient oil in the place where it is needed.

Accordingly it is one of the objects of this invention to provide a lubricating system for a refrigerating compressor that will direct the lubricant to the bearings and other moving parts from the oil reservoir without exposing such lubricant to the possibility of being sucked up with the refrigerant gas prior to reaching the bearings. It is also another object of the invention to provide an oil pump means that will positively direct the oil to the bearings. Furthermore, the oil reaches the bearings with a more solid body than it would be if it were first churned up by a splasher.

A preferred application of the invention is disclosed in the drawings. In Fig. 1 is disclosed a 2 cylinder compressor with the usual eccentric operating the pistons in said cylinder. This compressor is substantially similar to that described in the copending application of John H. Sheats Sr. No. 374,685 filed June 29, 1929. This compressor has the casing 10 having an operating shaft 11 journalled therein. Besides this operating shaft the compressor has other moving parts such as the eccentric 12, piston rod 13, piston pins 14 and pistons 15.

To provide an efficient lubricating system for the bearings of these moving parts a pumping means has been provided in the casing and a preferred form of such pumping means is disclosed in Figs. 1 and 3. A filter 16 of fine wire mesh or of suitable cloth which may be tubular or of any other desired shape is located in the bottom of the crank case portion 17 of the compressor. This screen may be attached to a projection 18 on the bottom plate 19 of the crank case. If desired the handle 20 as secured to the filter may be located in a fork in the projection 18 with a frictional fit so that it can be removed therefrom for cleaning purposes if desired. The side of the filter opposite the handle 20 is preferably secured to a strap 21 adapted to surround the hollow cylinder 22. This strap 21 has an opening 23 therethru for the passage of oil to the cylinder 22.

The cylinder 22 has a groove 24 about its periphery corresponding in position to the height of the passageway 23. At at least one place this groove is perforated as at 25 thru to the interior of the hollow cylinder 22 for oil to pass therethru. Altho it is desirable to locate this thru passageway 25 to correspond with the passageway 23 yet if the cylinder should be changed in position the oil will still pass thru the opening 25 as the groove 24 will always be adjacent the opening 23.

The bottom portion of the cylinder 22 preferably has a rounded rib 26 located thereon. This rounded rib rests on a spring cradle comprised of the spring 27 and cradle portion 28. This spring cradle is preferably fastened to the bottom plate 19 by any suitable fastening means such as the screws 29 and also has located thereunder a depression 30 to allow flexing of the spring. If desired in place of the flat spring a coiled spring could be used with any suitable positioning means for the spring such as a depression corresponding in diameter to that of the spring in the plate 19.

The cylinder 22 is adapted to receive therein a plunger 31 having a hollow portion or passageway 32 therein. The head of the plunger is preferably in the form of a strap 33 that passes about an eccentric portion 34 supported by the shaft 11. It is preferable to have a nut 35 of the shaft 11 in order to prevent eccentric 12 from shifting against the pump mechanism just described. A spring 36 is preferably coiled about the upper portion of the plunger and has its end bearing against the top of the cylinder 22 and a shoulder 37 on the plunger.

The passageway 32 inside of the plunger communicates preferably with a passageway 38 in the eccentric 33 that communicates in turn with a passageway 39 in the eccentric 12 through a hollow dowel pin 52. This dowel pin also provides a driving connection between the two eccentrics. As disclosed more fully in Figs. 2 and 4, this passageway extends to the periphery of the eccentric 12 and also preferably extends upward in the shape of a groove 40 in the surface of the eccentric to a passageway 41 extending thru the center of the shaft 11. This passageway 41 thus communicates with a passageway 42 extending for a considerable distance thru the center of the shaft. At the position of the other piston rod another passageway 43 extends thru the shaft and eccentric to communicate with a passageway 44 thru the piston rod 13. Each of the piston pins has preferably a hollow portion 46 therein and has the passageway 44 connected thereto by an opening 45. Another branch passage extends from the center opening 46 thru one or more openings 47 to the surface of the piston pin 14. Another passageway 48 extends from the central passageway 42 of the shaft 11 at approximately one end thereof in order to lubricate the bearing surface of the shaft 11 adjacent the seal 49.

As the oil in the crank case 17 passes thru the filter 17 any foreign articles are separated therefrom. The filtered oil or lubricant passes thru the openings 23 and 25 to the interior of the cylinder 22 as the plunger 31 is drawn up above the opening 25 by the eccentric 35. When the eccentric 34 presses down the plunger the opening 25 is shut off and the oil is forced up the central passageway 32 and passes into the passageway 38 and from thence to the passageway 39.

From the passageway 39 it passes to the surface 40 of the eccentric 12 adjacent the right hand connecting rod. The lubricant passes up the passageway 44 in the rod to the pin 14. From the hollow part 46 of the piston pin the lubricant is distributed thru the holes 47 to the surface of the piston pin 14 and also lubricates the outer surface of the piston 15.

The other portion of the oil passes from the groove 40 thru the passageway 41 to the passageway 42 extending thru the center of the operating shaft 11. Part of this oil lubricates the right hand end 50 where it is journalled in the casing 10. Another portion of the oil passes thru the passageway 43 to lubricate the other eccentric and piston pin and piston in a manner similar to the lubrication of the first eccentric and piston pin. Another portion of the oil passes thru the passageway 48 and lubricates the left hand end of the shaft 11 in Fig. 1 where it is adjacent the seal 49. A hole 51 permits the return of this oil to the crank case.

It will be noted that the oil or lubricant is filtered and is then distributed thru a series of passageways in a positive manner directly to the bearings that need oil. Due to the fact that the oil is forced thru the passageways it arrives at the bearings in a solid body and is not churned into a foam and splashed about the casing. In this way the oil is less apt to be carried with the refrigerant to the other parts of the refrigerating system. In any event the oil is carried directly to the bearings before it is exposed to the danger of being carried along with the refrigerant.

It will be noted that if too much oil begins to flow up the passageway 32 that the excess oil will exert a pressure against the spring 27 and flex this spring downward and by thus lowering the assembly it supports, shortens the effective stroke of the plunger 32. This shortened effective stroke of the plunger 31 will lessen the amount of oil passing up the passageway 32 until a suitable amount is again flowing when the spring assumes its natural position. Thus the construction of the spring cradle automatically maintains the desired oil pressure and flow passing up the passageway 32.

It will be noted that if it is desired to examine the apparatus or to clean the filter 16 that the plate 19 can be removed and this will carry with it the spring cradle and cylinder 22. After the screen has been cleaned or replaced the cylinder 22 can be inserted over the end of the plunger 31 and the pump means put in position by fastening the plate 19 to the bottom of the crankcase 17.

It is obvious that the form, shape and number of the elements disclosed may be varied especially where a different type of compressor is used.

While the form of embodiment of the invention as herein disclosed constitutes a preferred form, it is to be understood that other forms might be adopted, all coming within the scope of the claims which follow.

What is claimed is as follows:

1. A compressor having a casing, moving parts in said casing, a cylinder in said casing having a lubricant inlet therein and pump means operating within said cylinder to force lubricant to said moving parts and a spring cradle supporting said cylinder.

2. A compressor having a casing, moving parts in said casing, means to lubricate said moving parts and supporting means for said first mentioned means adapted to regulate the flow of lubricant supplied to said moving parts in accordance with the back pressure developed in said first named means.

3. A compressor having a casing, moving parts in said casing, means to lubricate said moving parts and supporting means for said first mentioned means adapted to automatically regulate the flow of lubricant supplied to said moving parts in accordance with the back pressure developed in said first named means.

4. A compressor having a casing, moving parts in said casing, an oil pump in said casing to supply oil to said moving parts, supporting means for said oil pump adapted to regulate the rate of supply of said oil in accordance with the back pressure developed in said oil pump.

5. A compressor having a casing, moving parts in said casing, an oil pump in said casing to supply oil to said moving parts, supporting means for said oil pump adapted to automatically regulate the rate of supply of said oil in accordance with the back pressure developed in said oil pump.

6. A compressor having a casing, moving parts in said casing, an oil pump in said casing to supply oil to said moving parts, flexible means for supporting said oil pump, said flexible means being responsive to the back pressure of the oil being supplied to said moving parts.

7. A compressor having a casing, moving parts in said casing, an oil pump in said casing to supply oil to said moving parts, a plunger operating in said oil pump and supporting means for said oil pump, said supporting means adapted to regulate the effective stroke of said plunger in response to the back pressure of oil being supplied to said moving parts.

8. A compressor having a casing, moving parts in said casing, a cylinder in said casing having a lubricant inlet therein and pump means operating within said cylinder to force lubricant to said moving parts and resilient means supporting said cylinder.

In testimony whereof I hereto affix my signature.

OTTO M. SUMMERS.